United States Patent [19]

Niki

[11] 4,346,672
[45] Aug. 31, 1982

[54] WATER DISPENSER FOR SMALL ANIMALS

[76] Inventor: Motohiro Niki, 22-11, Yushima 2-Chome, Bunkyo-Ku, Tokyo-To, Japan

[21] Appl. No.: 230,131

[22] Filed: Jan. 30, 1981

[51] Int. Cl.³ .............................................. A01K 7/00
[52] U.S. Cl. .................................................. 119/72.5
[58] Field of Search ...................... 119/72, 72.5, 74, 75

[56] References Cited
U.S. PATENT DOCUMENTS

| 3,734,063 | 5/1973 | Atchley | 119/72.5 |
| 3,771,496 | 11/1973 | Atchley | 119/72.5 |
| 3,874,343 | 4/1975 | Niki | 119/75 X |
| 4,246,870 | 1/1981 | Gustin | 119/75 |

Primary Examiner—Gene Mancene
Assistant Examiner—Robert P. Swiatek

Attorney, Agent, or Firm—Ladas & Parry

[57] ABSTRACT

A water dispenser for feeding small animals comprising a casing supplied with water under positive pressure and having an outlet at its downstream part, a valve for controlling water feed disposed in the outlet, and a water feed tube. The valve comprises an elastic valve seat member having an annular disk portion constituting the valve seat and a cylindrical portion formed coaxially and integrally with the disk portion and a poppet valve normally closed against the valve seat and fixed to the upstream end of the feed tube, which, upon being nudged and moved at its downstream end by a small animal, opens the poppet valve to permit water from a supply to enter the cylindrical portion of the valve and then into the feed tube. A flow control rod with transverse comb-cut grooves is inserted in the feed tube to prevent excessive rushing of water therethrough.

4 Claims, 7 Drawing Figures

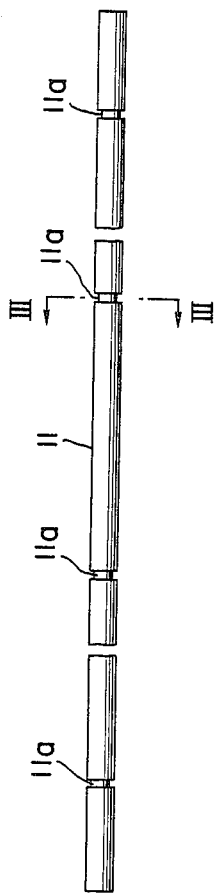
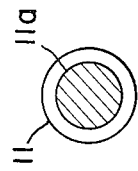
FIG. 3
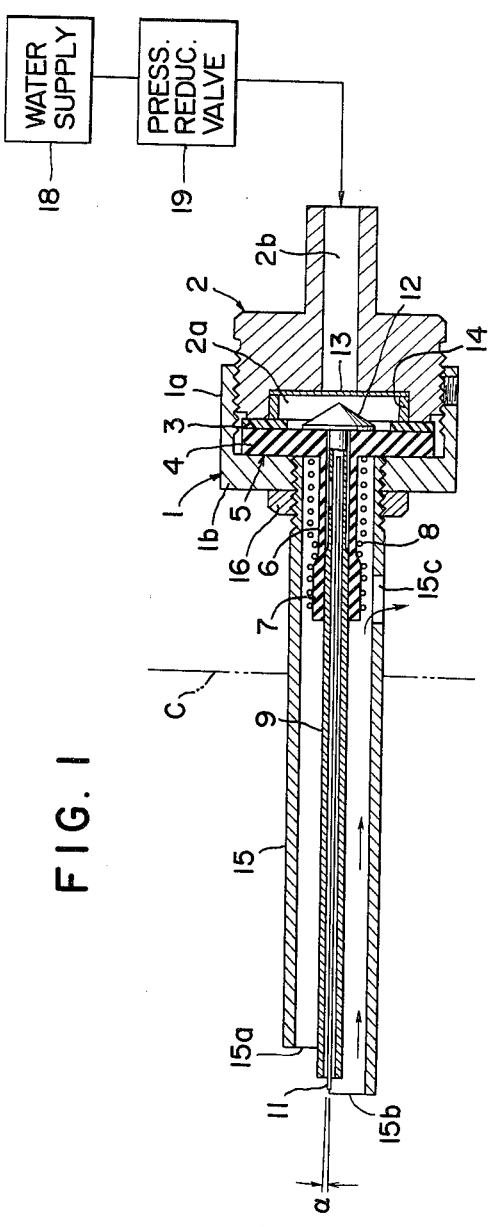
FIG. 1
FIG. 2

WATER DISPENSER FOR SMALL ANIMALS

BACKGROUND OF THE INVENTION

This invention relates generally to water dispensers for feeding small animals, and more particularly to an improved type thereof specifically adapted for feeding mice and rats.

Automatic feeding of drinking water to experimental animals is essential for labor-saving breeding of these animals and for providing a supply of drinking water at all times.

Among water dispensers for various small animals and birds, those for the mice and rats are technically most retarded, and almost none of the devices proposed heretofore have yet been accepted for general use. The reason for this is that a large number of water dispensers are required since mice and rats constitute a majority of the experimental animals. This requirement inevitably necessitates a simplified construction of water dispensers which can be produced at a substantially low cost. Despite this necessity for low-cost construction, however, requirements such as prevention of water leakage and provision of sensitivity in operation are more strict than those for the water dispensers for other animals and birds. These requirements arise from the requirement that the care of these animals be almost completely free of labor such as bed cleaning and drying and the requirement that the drinking water be readily supplied upon application of a weak nudging force of the mice and rats against a part of the water dispenser but can be instantaneously stopped upon removal of the same force with some water always kept in a part of the dispenser so that the animal can easily find the part to be nudged.

SUMMARY OF THE INVENTION

An object of the present invention is to provide a water dispenser for feeding small animals of simple construction and low production cost which can be supplied with water at a positive pressure, and which has a water feed tube provided therein with a feed-control member for regulating the flow of water therethrough and preventing water from rushing therethrough in excessive quantity.

Another object of the present invention is to provide a water dispenser for feeding small animals having valve means which is extremely sensitive in operation, whereby the drinking water can be released by a slight nudging of the water feed tube by a small animal.

Still another object of the invention is to provide a water dispenser for feeding small animals wherein leakage of the drinking water at the time of closure of the valve is substantially eliminated.

An additional object of the invention is to provide a water dispenser for feeding small animals wherein some water is always retained in a part of the dispenser where its presence can be sensed by a small animal at the dispensing end of the feed tube.

These and other objects have been achieved by the present invention, according to which there is provided an improved construction of a water dispenser comprising: a water feed tube; a control valve interposed between the upstream end of the feed tube and a source of water and closing normally to prevent water from flowing into the feed tube, said valve having means to open it in response to inclination of the feed tube caused by a nudging force applied by a small animal to the downstream end of said tube; and a flow control member inserted in the feed tube to prevent excessive rushing of water therethrough.

The nature, principle, and utility of the present invention will be more clearly apparent from the following detailed description of the invention when read in conjunction with the accompanying drawings.

BRIEF DESCRIPTION OF THE DRAWINGS

In the drawing:

FIG. 1 is a side elevation in longitudinal section showing one example of a water dispenser according to this invention;

FIG. 2 is a relatively enlarged side view of a feed control rod to be used within a water feed tube of the water dispenser shown in FIG. 1;

FIG. 3 is a further enlarged cross section taken along the plane indicated by line III—III in FIG. 2;

DETAILED DESCRIPTION OF THE INVENTION

Figure 4:
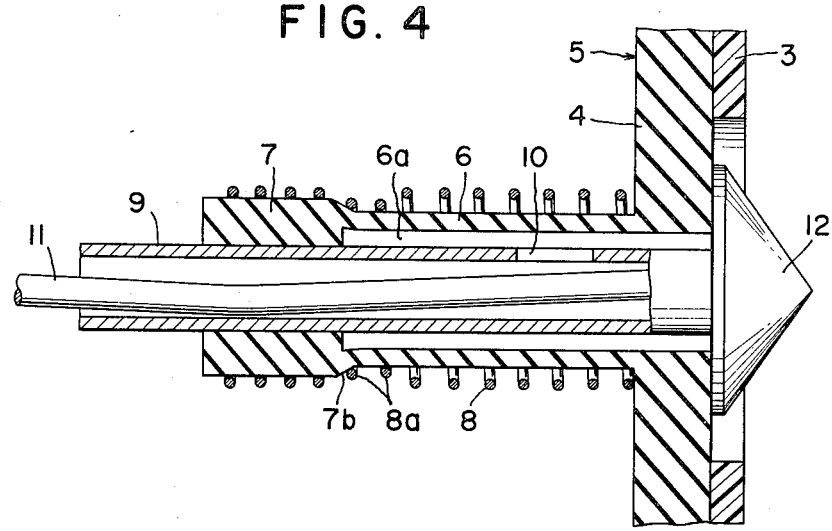
FIG. 4 is an enlarged fragmentary side view in longitudinal section showing valve means and related parts of the same water dispenser.

In the preferred embodiment of this invention as illustrated in the accompanying drawings, the water dispenser is used in a substantially horizontal state with its upstream end disposed outside (to the right as viewed in FIG. 1) of a vertical wall C of a cage or pen housing one or more small animals and with its downstream water-dispensing end disposed inside the vertical wall C. In actual use, the water dispenser is mounted with a slight inclination as indicated by a small angle $\alpha$, that is, the axis of the dispenser is downwardly sloped from the water-dispensing end toward the valve mechanism. The purpose of this inclination will be described hereinafter.

This water dispenser has a casing (or a supporting member) 1 of the shape of a cylindrical cup or screw socket comprising a cylindrical wall part 1a with a tapped inner surface and an end wall part 1b with a central tapped hole. A nipple-like screw fitting 2 having a recessed cavity 2a at its inner end and a central through hole 2b communicating with the cavity 2a and the open inner end of the fitting 2 is screwed into the cylindrical wall part 1a of the casing 1. When this screw fitting 2 is thus fully screwed into the casing 1, its inner end abuts against an annular elastic washer 3 coaxially contacting a flange part 4 of an elastic valve seat member 5 in contact on its opposite side with the above mentioned end wall part 1b of the casing 1. The washer 3 and the flange part 4 of the valve seat member 5 are thereby clamped firmly between the screw fitting 2 and the casing 1.

The elastic valve seat member 5 also has a hollow cylindrical portion 6 formed coaxially and integrally with the flange part 4 and extending downstream therefrom. This cylindrical portion 6 has a central bore 6a (FIGS. 4 and 5) which extends upstream through the flange part 4 and is communicable with the above mentioned cavity 2a depending on the seating state of a poppet or lift valve 12 relative to the flange part 4 of the valve seat member 5. The cylindrical portion 6 has at its downstream end an end wall part 7 having a central bore 7a of an inner diameter less than the inner diameter of the central bore 6a of the cylindrical portion 6.

The above mentioned poppet valve 12 of conical shape is coaxially fixed at its base to the upstream end of a water feed tube 9, the outer diameter of which is less than the diameter of the base of the valve 12. The annular base part of the valve 12 thus left is the valve surface for seating against the planar surface of the flange part 4 of the valve seat member 5. In assembled state, the feed tube 9 extends through the central bores 6a and 7a of the cylindrical portion 6 and the end wall part 7 of the elastic valve seat member 5. The outer diameter of the feed tube 9 is also less than the inner diameter of the above mentioned central bore 6a of the cylindrical portion 6 of the valve seat member 5, whereby an annular or cylindrical space is formed between the feed tube 9 and the cylindrical portion 6.

Figure 5:
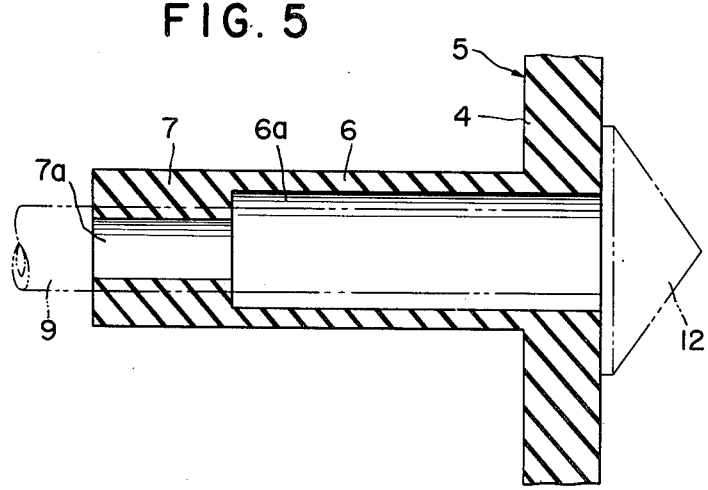
FIG. 5 is a view similar to FIG. 4 of an elastic valve seat member in its free state prior to insertion of the water feed tube through an end wall part thereof.

The inner diameter of the central bore 7a of the end wall part 7, however, is made to be less than the outer diameter of the feed tube 9 in the initial, free state of the elastic valve seat member 5 prior to assembly, as best shown in FIG. 5. This difference in diameters will not only provide a water-tight fit between the inner surface of the bore 7a and the tube 6 but also tend to enlarge the outer diameter of the end wall 7, as shown in FIG. 4, to a value somewhat greater than the cylindrical portion 6 at its upstream part, whereby an annular shoulder 7b will be formed around the outer surface at the junction between the cylindrical portion 6 and the end wall 7. This shoulder 7b has a useful function as described hereinafter.

In the assembling of the feed tube 9 relative to the elastic valve seat member 5, the feed rod 9 is inserted, with its downstream end in leading position, into and through the open upstream end of the central bore 6a, through the interior of the bore 6a, and forcibly through the bore 7a. In the final assembled state, the cylindrical portion 6 and, to a lesser degree, the end wall part 7 are caused to be in a compressed state, which is maintained by the firm frictional contact between the wall of the central bore 7a and the outer surface of the feed tube 9 and by the abutting contact between the base of the valve 12 and the valve seat 4. Accordingly, an elastic force in the downstream direction is exerted on the feed tube 9, tending to maintain the base of the valve 12 flush against the valve seat 4, whereby the valve 12 is in its normally closed state.

The feed tube 9 is provided at a part thereof to be positioned within the central bore 6a with a through hole 10 formed through its wall to permit water in the above mentioned cylindrical space between the feed pipe 9 and the cylindrical portion 6 to flow into the interior of the feed tube 9 when the valve 12 is opened. When the valve 12 is subsequently closed, the flow of water stops, but some water is always retained in the above mentioned cylindrical space and can be sensed by a small animal near the downstream end of the feed tube 9.

Figure 6:
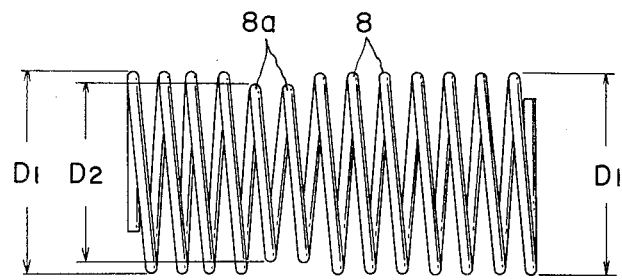
FIG. 6 is an enlarged side view of coil spring to be fitted in compressed state encompassingly about a cylindrical portion of the elastic valve seat member shown in FIG. 5.

At least the cylindrical portion 6 of the elastic valve seat member 5, exclusive of the end wall part 7, is encompassed by an elastic reinforcing structure, which in the instant example is a coil spring 8. In the illustrated example, this coil spring 8, in its assembled state, extends from the inner surface of the flange portion 4 of the member 5 to the downstream or inner end of the end wall 7. As best shown in FIG. 6, this coil spring 8 is of substantially the same coil diameter $D_1$ at its outer and inner ends but has a constricted intermediate part 8a of a diameter $D_2$ which is somewhat less than the diameter $D_1$. When the coil spring 8 is fitted on the cylindrical portion 6 in assembled state, it is in a compressed state, which is maintained by its abutment at its outer end against the inner surface of the flange portion 4 and by its firm constriction at its intermediate part 8a around the inner part of the cylindrical portion 6 adjacent to the afore-described shoulder 7b at the outer end of the end wall 7.

Because of the relatively small diameter $D_2$ of the intermediate part 8a of the spring 8, this inner part is somewhat constricted by the inner surface of the part 8a to assume a depressed waisted shape. This waisted depression, together with the shoulder 7b, effectively function to fixedly hold the intermediate part 8a of the spring 8. At other parts of the diameter $D_1$ of the coil spring 8 on both sides of the intermediate part 8a, the spring 8 is fitted somewhat loosely around or is clear of the cylindrical portion 6 or the end wall 7.

The coil spring 8 functions to assist the elastic cylindrical portion 6 of the valve seat member 5 in exerting an inward force on the base of the poppet valve 12 (or exerting an outward force on the flange portion 4) tending to keep the base of the valve 12 in tight intimate contact with the outer surface of the flange portion 4 of the valve seat member 5 when the valve member 12 is in its normally closed state. This function of the coil spring 8 is important particularly when the silicone rubber valve seat member 5 loses some of its elasticity after a great number of sterilizations with steam.

Another function of the coil spring 8 is to reinforcingly hold the inner part of the cylindrical portion 6 and end wall 7 of the valve seat member 5 thereby to deter cracking or tearing of these parts and, in the event that cracks or tears should develop, to prevent them from spreading.

In the water dispenser of the above described construction, the elastic valve seat member 5 is made of a heat-resistant and water-resistant material having the required elasticity such as a synthetic rubber, preferably a silicone rubber. All other parts are preferably made of 18-8 stainless steel so that they can withstand repeated sterilization with steam and resist corrosion.

A feature of the water dispenser of this invention is that, in its installed state with respect to a cage or pen housing one or more small animals, it can be automatically supplied with water under positive pressure from a continuous supply of water such as city water. In the example illustrated in FIG. 1, water is supplied by a source 18 such as a tap for supplying city water, through a pressure-reducing valve 19 to the aforementioned central through hole 2b of the screw fitting 2. This feature affords great convenience in supplying fresh water particularly to a large number of water dispensers.

However, although the source water pressure is reduced somewhat by the pressure-reducing valve 19 before the water reaches the dispenser, the water is apt to rush through the feed tube 9 and gush out wastefully into the cage and onto the cage bed or floor when the valve 12 is opened unless it is controlled by some flow control means. An important feature of this invention is the provision of such a flow control means in the form of a feed control rod 11 inserted through and disposed in the water feed tube 9.

Figure 7:
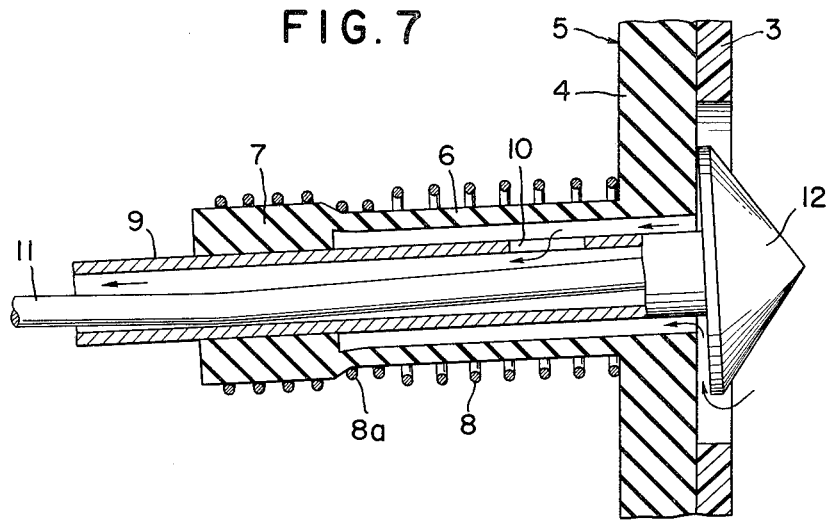
FIG. 7 is a view similar to FIG. 4 showing the valve means and related parts in a deflected state due to movement of the downstream end of the feed tube, in which state the valve is partly opened.

This feed control rod 11 is of a diameter such that the space formed between it and the inner wall surface of the feed tube 9 is of suitable capillary dimension. Three or more spaced-apart annular grooves 11a are formed around this feed control rod 11 as shown in FIGS. 2 and 3. These grooves 11a, which function similarly as comb cuts in the so-called feed in a fountain pen, have been found to add to the effectiveness of the feed control. The rod 11 can be retained in the feed tube 9 by any of various means. A very simple measure for this purpose, as indicated in FIGS. 4 and 7, is to bend the rod 11 slightly before inserting it into the feed tube 9 thereby to cause it to be retained in the feed tube by friction. The grooves 11a may be dispensed with as shown in FIGS. 4 and 7.

In certain cases, the water supplied from the water source 18 may contain impurities, which would impair the operation of water dispenser. Accordingly, a filtering device 13 is provided at the inlet to the cavity 2a of the screw fitting 2 and is held in place by a spacer 14. A pressure relief valve (not shown) may be provided in the water supply line at a point upstream from this filter device 13 in order to prevent excessive pressure buildup on the filter device in the event that it should become clogged with impurities. This precaution may be unnecessary since the water dispenser is ordinarily cleaned and sterilized quite frequently.

The outer threaded end of a guard tube 15 is screwed into the above mentioned central tapped hole of the end wall part 1b of the casing 1. A nut 16 is also screw engaged with the threaded end of the guard tube 15 to lock the screw engagement between guard tube 15 and the casing 1. A semicylindrical cutout 15a is formed at the inner or downstream end of the guard tube 15 so as to expose the inner or downstream end of the feed tube 9 to nudging action by a small animal. The extreme inner end 15b of the guard tube 15 which is not thus cut out extends inward beyond the inner end of the feed tube 9 and thus protects the feed tube. This extreme inner end 15b also serves as a drip pan to catch excess or unused water dripping from the inner end of the feed tube 9.

In actual use, the water dispenser is mounted on a side wall of a cage or pen with a slight inclination as mentioned hereinbefore, and the water supply piping is installed as indicated in FIG. 1 to connect the water supply 18 and the pressure-reducing valve 19 to the screw fitting 2 of the dispenser. The poppet valve 12 is normally closed against the valve seat surface of the valve seat member 5, whereby the water from the water supply 18 is prevented from entering the feed tube 9.

When the inner or downstream end of the water feed tube 9 is touched by a small animal such as a mouse or a rat, the water feed tube 9 is thereby angularly displaced as shown in FIG. 7 against the resilient force of the elastic valve seat member 5. The base of the poppet valve 12 at the outer or upstream end of the water feed tube 9 is thereby inclined relative to the planar valve seat surface of the valve seat 5, thus forming a narrow gap on one side thereof between the base surface of the valve and the valve seat surface of the valve seat member 5. Water in the chamber 2a is thus passed through the narrow gap into the cylindrical space formed within the cylindrical portion 6 of the valve seat member 5. The water is then passed through the hole 10 to the interior of the water feed tube 9, and thereafter toward the inner end of the water feed tube 9.

Since the end wall 7 of the cylindrical portion 6 of the valve seat member 5 engages the circumferential wall of the water feed tube 9 in a water-tight manner, leakage of water through this part is completely prevented. Furthermore, the sizes of the poppet valve 12, hole 10, and the inner diameter of the water feed tube 9 are so selected that the flowrate of the water flowing through the water feed tube 9 at the time when the downstream end thereof is touched by a mouse or rat becomes suitable for normal drinking of the water by the mouse or rat. In this manner, the possibility of the water being spilled onto the cage bed can be substantially eliminated.

When the animal ceases to nudge the lower end of the water feed tube 9, the poppet valve instantaneously stops the water flow. In this case, however, the water filling the interior of the water feed tube or at least the cylindrical space formed in the cylindrical portion 6 of the valve seat member 5 is retained even after the closure of the valve means. A mouse or rat that desires to drink water senses the water vapor coming from the lower end of the water feed tube 6 and nudges the end as described above.

The guard tube 15 protects the water feed tube 9 from mechanical damage, and limits lateral movements of the water feed tube 9. When it is desired to readjust the contact pressure between the base of the valve 12 and the valve seat member 5, the water feed tube 9 can be slightly pushed into or pulled out of the cylindrical portion 6 of the valve seat member 5, being forcibly slid relative to the end wall part 7.

Any excess or unused portion of the water thus fed drips downward from the inner end of the feed tube 9 onto the lower part of the interior of the guard tube 15 at its extreme inner end 15b. The water thus caught by the guard tube 15 and prevented from dripping onto the bed or floor of the cage flows outward along the bottom part of the guard tube 15 as indicated by arrows, because of the aforedescribed inclination of the water dispenser, and flows out of the guard tube 15 through a drain hole 15c at a point outside of the cage.

Although this invention has been described in connection with a horizontal type water dispenser, it is apparent that the principle of the invention can be applied to a vertical type water dispenser.

What is claimed is:

1. A water dispenser for feeding small animals having upstream and downstream directions and comprising: a water feed tube having an upstream end through which water flows into the tube and a downstream end through which water flows out; a control valve interposed between the upstream end of the feed tube and a source of water and closing normally to prevent water from flowing into the feed tube, said valve having means to open it in response to inclination of the feed tube caused by a nudging force applied by a small animal to the downstream end of said tube; and a flow control member inserted in the feed tube to prevent excessive rushing of water therethrough, said flow control member being a bar having a cross sectional shape and size such as to define a passageway for water of capillary cross-sectional dimensions between said member and the inner wall surface of the feed tube.

2. A water dispenser according to claim 1 in which the bar has at least one groove in a plane transverse to the longitudinal direction of the feed tube.

3. A water dispenser according to claim 1 in which the upstream and downstream directions are substantially horizontal.

4. A water dispenser according to claim 1 in which the upstream and downstream directions are substantially vertical.

* * * * *